(12) United States Patent
Jordan

(10) Patent No.: US 7,676,655 B2
(45) Date of Patent: Mar. 9, 2010

(54) SINGLE BIT CONTROL OF THREADS IN A MULTITHREADED MULTICORE PROCESSOR

(75) Inventor: Paul J. Jordan, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 382 days.

(21) Appl. No.: 10/880,917

(22) Filed: Jun. 30, 2004

(65) Prior Publication Data

US 2006/0004988 A1    Jan. 5, 2006

(51) Int. Cl.
*G06F 9/30*    (2006.01)
(52) U.S. Cl. .................................... 712/214
(58) Field of Classification Search ............ 712/43
See application file for complete search history.

(56) References Cited

U.S. PATENT DOCUMENTS

| | | | |
|---|---|---|---|
| 5,046,068 A | | 9/1991 | Kubo et al. |
| 5,050,070 A | * | 9/1991 | Chastain et al. ............ 712/203 |
| 5,257,215 A | | 10/1993 | Poon |
| 5,339,266 A | | 8/1994 | Hinds et al. |
| 5,386,375 A | | 1/1995 | Smith |
| 5,515,308 A | | 5/1996 | Karp et al. |
| 5,546,593 A | | 8/1996 | Kimura et al. |
| 5,619,439 A | | 4/1997 | Yu et al. |
| 5,954,789 A | | 9/1999 | Yu et al. |
| 6,076,157 A | | 6/2000 | Borkenhagen et al. |
| 6,088,788 A | | 7/2000 | Borkenhagen et al. |
| 6,088,800 A | | 7/2000 | Jones et al. |

(Continued)

FOREIGN PATENT DOCUMENTS

WO    WO 00/68779    11/2000

OTHER PUBLICATIONS

Notification of Transmittal of the International Search Report and the Written Opinion of the International Searching Authority, International Application No. PCT/US2005/023078, Nov. 11, 2005.

(Continued)

*Primary Examiner*—Eddie P Chan
*Assistant Examiner*—John Lindlof
(74) *Attorney, Agent, or Firm*—Rory D. Rankin; Meyertons Hood Kivlin Kowert & Goetzel, P.C.

(57) ABSTRACT

A method and mechanism for controlling threads in a multi-threaded multicore processor. A processor includes multiple cores, each of which are capable of executing multiple threads. A control register which is shared by each of the cores is utilized to control the status of the threads in the processing system. In one embodiment, the shared register includes a single bit for each thread in the processor. Depending upon the value written to a bit of the shared register, one of three results may occur with respect to a thread which corresponds to the bit. In one embodiment, writing a "0" to a bit of the shared register will cause a corresponding thread to be Parked. Writing a "1" to a bit of the shared register will cause a corresponding thread to either be UnParked or be Reset. Whether writing a "1" to a bit of the register causes the corresponding thread to be UnParked or Reset depends upon a state of the processor.

20 Claims, 8 Drawing Sheets

U.S. PATENT DOCUMENTS

| | | | |
|---|---|---|---|
| 6,105,127 A | 8/2000 | Kimura et al. | |
| 6,131,104 A | 10/2000 | Oberman | |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |
| 6,523,050 B1 | 2/2003 | Dhablania et al. | |
| 6,564,328 B1 | 5/2003 | Grochowski et al. | |
| 6,567,839 B1 | 5/2003 | Borkenhagen et al. | |
| 6,594,681 B1 | 7/2003 | Prabhu | |
| 6,625,654 B1 | 9/2003 | Wolrich et al. | |
| 6,629,236 B1 | 9/2003 | Aipperspach et al. | |
| 6,629,237 B2 | 9/2003 | Wolrich et al. | |
| 6,668,308 B2 | 12/2003 | Barroso et al. | |
| 6,668,317 B1 | 12/2003 | Bernstein et al. | |
| 6,671,827 B2 | 12/2003 | Guilford et al. | |
| 6,681,345 B1 | 1/2004 | Storino et al. | |
| 6,687,838 B2 | 2/2004 | Orenstien et al. | |
| 6,694,347 B2 | 2/2004 | Joy et al. | |
| 6,694,425 B1 | 2/2004 | Eickemeyer | |
| 6,697,935 B1 | 2/2004 | Borkenhagen et al. | |
| 6,728,845 B2 | 4/2004 | Adiletta et al. | |
| 6,748,556 B1 | 6/2004 | Storino et al. | |
| 6,801,997 B2 | 10/2004 | Joy et al. | |
| 6,820,107 B1 | 11/2004 | Kawai et al. | |
| 6,847,985 B1 | 1/2005 | Gupta et al. | |
| 6,857,064 B2 | 2/2005 | Smith et al. | |
| 6,883,107 B2 | 4/2005 | Rodgers et al. | |
| 6,889,319 B1 | 5/2005 | Rodgers et al. | |
| 6,898,694 B2 | 5/2005 | Kottapalli et al. | |
| 2002/0116587 A1 | 8/2002 | Modelski et al. | |
| 2003/0014471 A1 | 1/2003 | Ohsawa et al. | |
| 2003/0037089 A1* | 2/2003 | Cota-Robles et al. | 709/1 |
| 2004/0215932 A1* | 10/2004 | Burky et al. | 712/43 |

OTHER PUBLICATIONS

Written Opinion of the International Searching Authority, International Application No. PCT/US2005/023078, Nov. 11, 2005.

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Smith, "The End of Architecture," May 29, 1990, pp. 10-17.

Alverson et al., "Tera Hardware-Software Cooperation," 16 pages.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within a Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

* cited by examiner

SINGLE BIT CONTROL OF THREADS IN A MULTITHREADED MULTICORE PROCESSOR

BACKGROUND OF THE INVENTION

1. Field of the Invention

The invention relates to computing systems and, more particularly, to the management of threads in a multithreaded processing system.

2. Description of the Related Art

In a multithreaded processor, each thread may act as a separate physical processor. In such a processor, there must generally exist mechanisms by which each thread may be initialized, started, and/or stopped. Therefore, each thread must generally be configured to receive an initial indication to start executing, such as a reset or initialization indication. Once a thread begins executing, software may want to temporarily stop that thread. For example, in a system that has a very demanding power or heat threshold, threads may be idled to reduce power consumption or limit heat production. Alternatively, if a given thread requires exclusive use of the memory subsystem or some other shared resource, the other threads which are executing may be stopped temporarily.

In a multithreaded multicore processor, each core may be capable of executing multiple threads in hardware. As the cores of such a processor may generally be configured to act in a somewhat cooperative manner, threads in one core may affect the operation of threads in another core. Accordingly, as the number of cores and/or threads increase, the lines of communication between threads in the processor also increase, and mechanisms for controlling the threads may quickly become quite complex. However, as processor die area is generally always at a premium, and more complex mechanisms are more likely to have errors and be more difficult to verify, an efficient mechanism for controlling threads is desired.

Accordingly, an effective method and mechanism for initializing, starting, and stopping threads is desired.

SUMMARY OF THE INVENTION

A method and mechanism are contemplated for controlling threads in a multithreaded multicore processor. In one embodiment, a processor includes multiple cores, each of which are capable of executing multiple threads. A control register which is shared by each of the cores is utilized to control the status of the threads in the processing system. In one embodiment, the shared register includes a single bit for each thread in the processor. Depending upon the value written to a bit of the shared register, one of three results may occur with respect to a thread which corresponds to the bit. In one embodiment, writing a "0" to a bit of the shared register will cause a corresponding thread to be Parked. Writing a "1" to a bit of the shared register will cause a corresponding thread to either be UnParked or be Reset.

In one embodiment, the first zero to one transition of a bit in the shared register may be distinguished from subsequent zero to one transitions of the bit. In one embodiment, each core includes circuitry for each thread supported by the core which monitors the state of corresponding bits in the shared register. During a system initialization sequence, latches in the circuitry may be set to 0. If the latch has a value of 0 and a corresponding bit in the shared register transitions from 0 to 1, a thread Reset signal is generated which may cause the corresponding thread to be reset or otherwise initialized. If the latch has a value of 1 and a corresponding bit in the shared register transitions from 0 to 1, the corresponding thread will be unparked. If the value of the bit in the shared register transitions from 1 to 0, then the corresponding thread is parked.

Also contemplated is a multithreaded multicore processor wherein the shared register is external to each of the cores. A first bus is utilized by the cores to perform read and write accesses to the shared register. Different buses are then utilized by each of the cores to monitor the status of bits in the shared register. In one embodiment, each core may perform read or write accesses to any of the bits in the shared register and thereby affect the status of threads in any of the other cores.

Also contemplated is circuitry located within each of the cores which is coupled to monitor the bits of the shared register which correspond to the respective core. The circuitry is configured to convey a Park, UnPark, or Reset signal to the execution pipeline(s) of the core in order to affect the status of corresponding threads. In one embodiment, parking a thread temporarily idles a thread by preventing fetching of additional instructions for the thread.

These and other embodiments, variations, and modifications will become apparent upon consideration of the following description and associated drawings.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Overview of Multithreaded Processor Architecture

Figure 1:
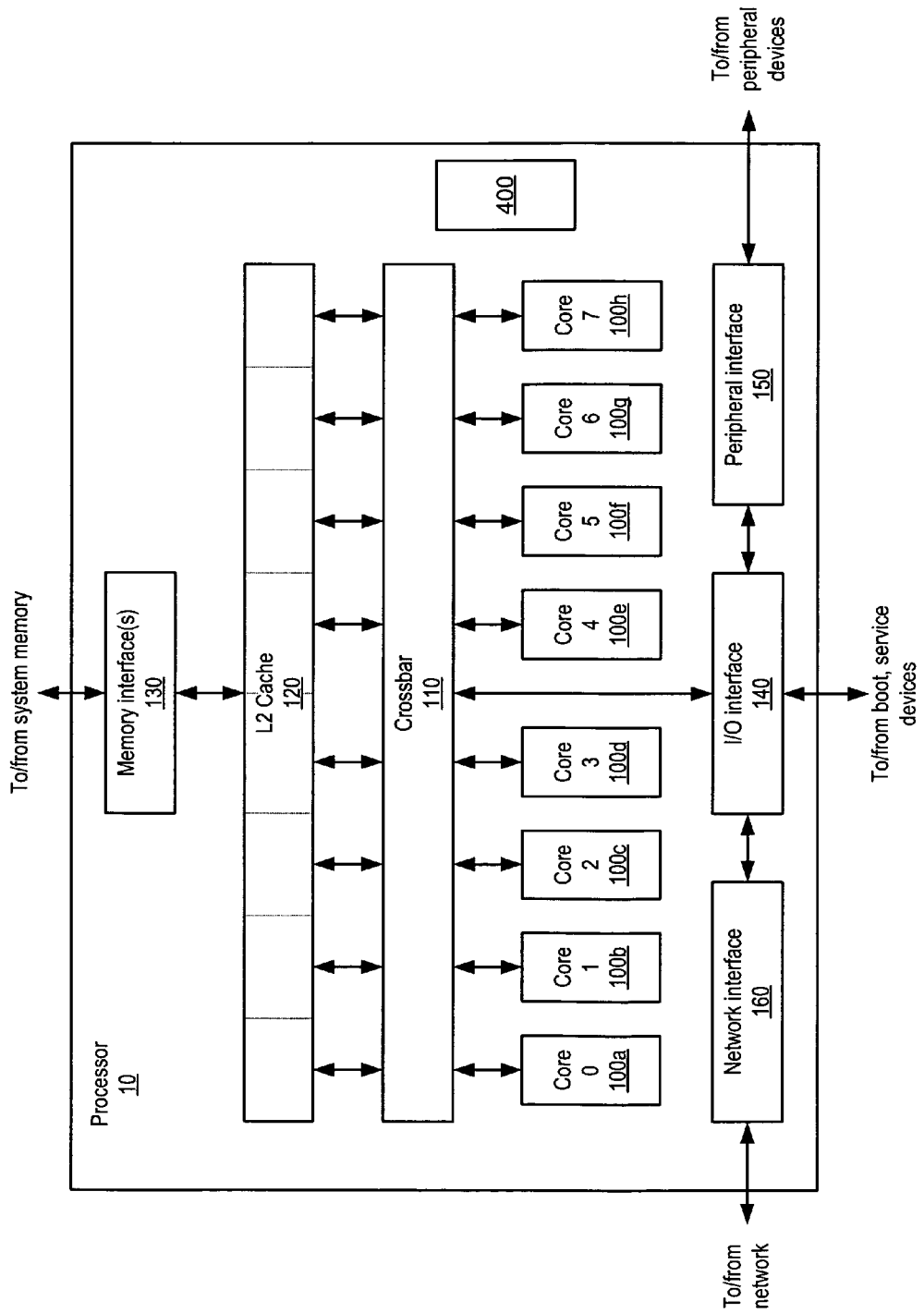
FIG. 1 is a block diagram illustrating one embodiment of a multi-threaded multi-core processor.

A block diagram illustrating one embodiment of a multi-threaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network. Also illustrated are registers 400. In one embodiment, each of cores 100 are coupled to access one or more registers which are included within registers 400 as will be discussed in more detail below.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices, and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example; although it is contemplated that any suitable networking standard may be implemented. In some embodiments, network interface 160 may be configured to implement multiple discrete network interface ports.

Overview of Fine-gained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
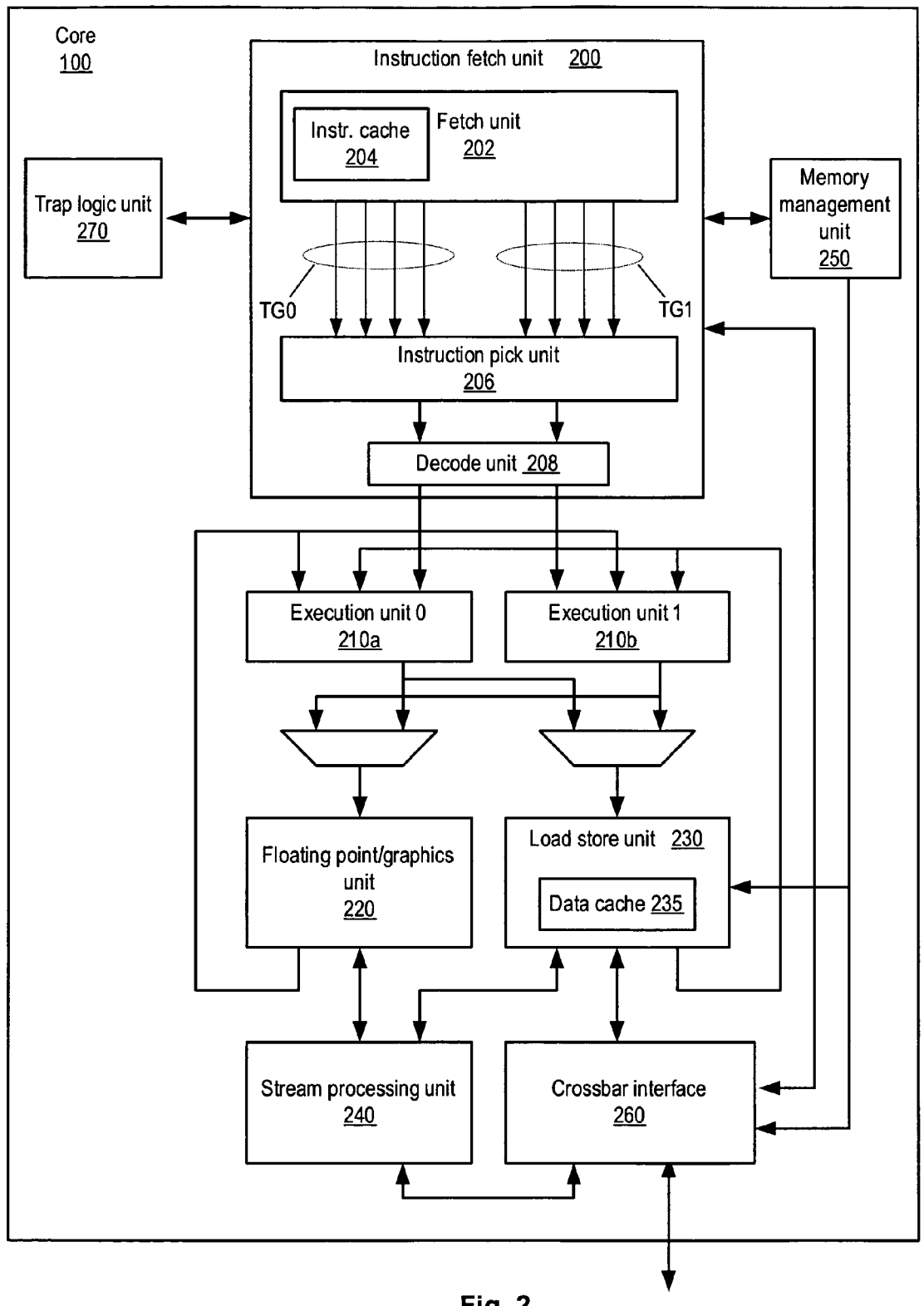
FIG. 2 is a block diagram illustrating one embodiment of a core depicted in FIG. 1.

FIG. 2 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Parking and Unparking Threads

In one embodiment, threads in a core may be "parked" or "unparked". Generally speaking, parking is a way to temporarily suspend the operation of a thread. Threads which have been parked may be unparked to start them running again. The parking and unparking of threads can be performed at arbitrary points in time and a global system reset is not required. In one embodiment, there may be an arbitrarily long, but bounded, delay from when a thread is directed to park or unpark until the change takes effect. In such an embodiment, a Thread Running Status register may be used to determine if a thread that has been directed to park has completed the process of becoming parked.

Generally speaking, a parked thread does not execute instructions and does not initiate any transactions on its own. When a thread is unparked, it continues execution with the instruction that was next to be executed when the thread was parked. In one embodiment, a request to park a thread may be treated as an interrupt request. In addition, thread parking may include disabling instruction fetching for threads that are parked. This will have the effect that after a thread is parked, it will execute the instructions currently in the pipe, complete pending transactions such as draining the store queue, and then become idle.

In one embodiment, a shared "Thread Running" register may be used to support parking and unparking of threads. Additionally, as illustrated by Table 1 below, in one embodiment separate addresses may be used for accessing the Thread Running register in order to minimize the need for synchronization between threads accessing the shared register. For ease of differentiation, different names may be given to the register depending upon which address is used for access. For example, the register may be referred to as the Thread Running RW register and accessed for normal reading and writing using a first virtual address (VA). Using a second virtual address, the register may be referred to as the Thread Running SET register and accessed as a write-only register where a write of 1 in a bit position sets the corresponding bit to 1 and a write of 0 in a bit position leaves the corresponding bit unchanged. Finally, the register may be referred to as the Thread Running CLR register and accessed as a write-only register where a write of 1 in a bit position clears the corresponding bit 0 and a write of 0 in a bit position leaves the corresponding bit unchanged. Alternative methods of accessing the shared register are possible and are contemplated.

When writing to the Thread Running register, there may be a choice between either writing a specific value to all bits and modifying individual bits. In one embodiment, when a single thread is parked, a write to the Thread Running CLR register should be used. When a thread wants to become the only thread active, it may be more appropriate to write the desired value directly to the Thread Running RW register.

TABLE 1

| REGISTER NAME | ACCESS | NOTE |
| --- | --- | --- |
| Thread Running RW | Read/Write | General access |
| Thread Running SET | Write only | Write to set bit(s) |
| Thread Running CLR | Write only | Write to clear bit(s) |

Figure 3:
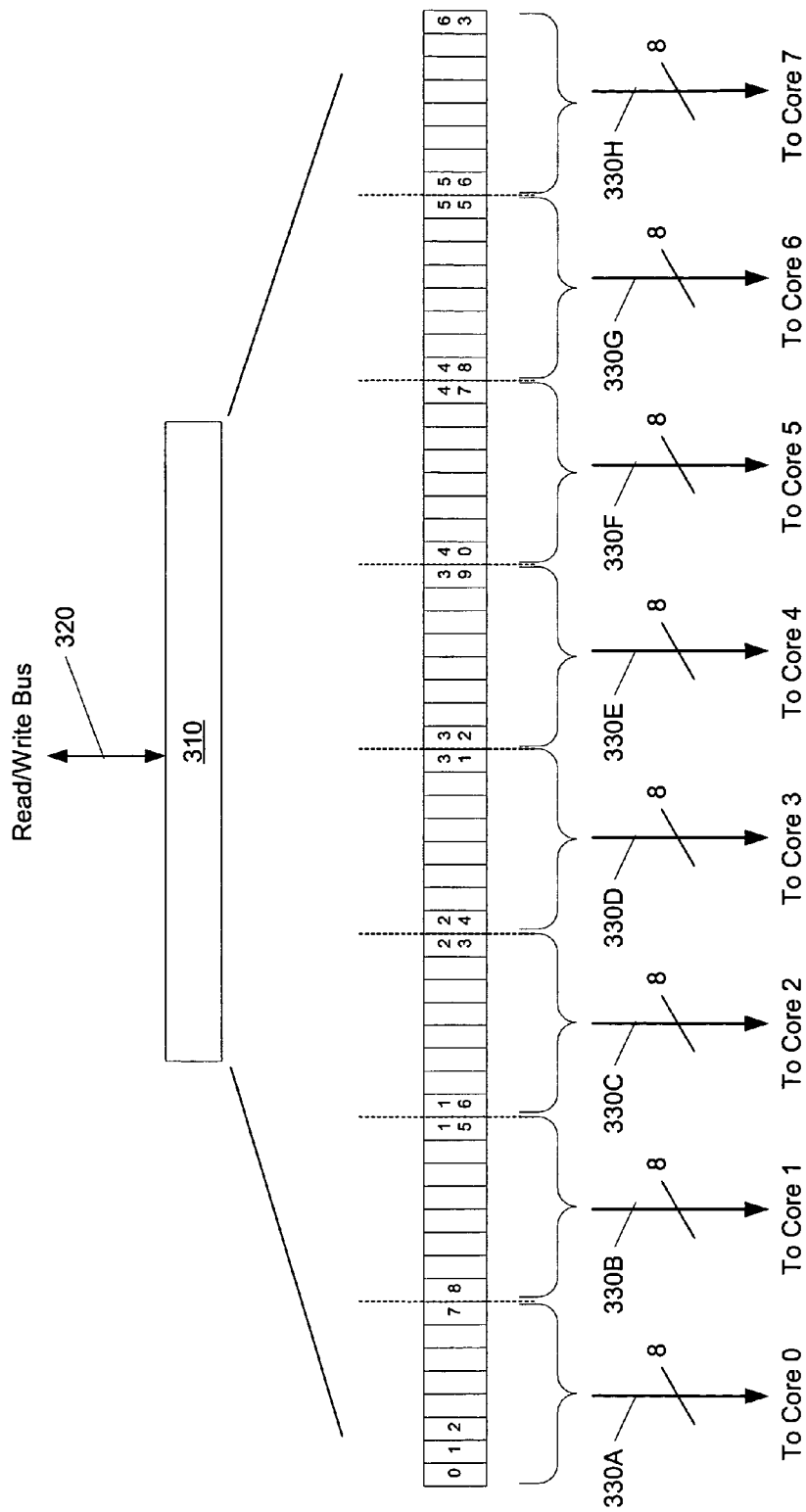
FIG. 3 is a block diagram illustrating one embodiment of a shared thread register.

FIG. 3 illustrates one embodiment of a Thread Running register 310 which is shared by each of cores 100. In the embodiment shown, register 310 includes 64 bits. Generally speaking, each bit in the register 310 corresponds to a single possible thread in one of cores 100. A value of 1 in a bit position activates (unparks) the corresponding thread for normal execution, while a value of 0 in a bit position parks the corresponding thread. In the above described embodiment wherein each core is configured to support eight threads, register 310 may be divided into groups of eight bits with each group corresponding to a different core. As shown in FIG. 3, each group of eight bits is coupled to the corresponding core by a bus including at least eight bits. For example, the first eight bits (bits 0-7) of register 310 correspond to core 0 110*a* and are coupled to the core 100*a* via bus 330A. The second group of eight bits (bits 8-15) are coupled to core 1 100*b* via bus 330B. Finally, each of the remaining bits are shown to be coupled to a corresponding core 100 via one of buses 330C-330H. In one embodiment, each of cores 100 is coupled to perform read and write accesses to the register 310 via a shared bus. Alternative bus arrangements and register configuration are possible and are contemplated.

When a thread executes an instruction which is configured to park itself by updating the Thread Running register and follows the update with a FLUSH instruction, the hardware may be configured to guarantee that no instruction after the FLUSH instruction will be executed until the thread is unparked. The FLUSH instruction may be either executed before parking takes effect or after the thread is unparked.

Generally speaking, at least one thread remains unparked. The hardware may be configured to enforce the restriction that any update to the Thread Running register cannot cause all the enabled threads to become parked. This restriction may be important in order to avoid the case where all threads become parked and there is no way to reactivate any of the threads.

In systems with a service processor, the value of the Thread Running register 310 may be changed using the service processor interface during a global system reset. In this way the service processor (which may be the boot master in this system) can unpark the proper threads before a processor starts its boot sequence. If during the boot sequence the service processor changes the threads which are enabled or disabled, it may need to update the Thread Running register 310 if a thread originally designated as unparked will not be enabled.

Because there may be a delay between the time a thread is directed to park until it actually becomes parked, a separate Thread Running Status register may be provided to indicate when a thread actually becomes parked. The Thread Running Status register may be a shared, read-only register where each bit indicates whether the corresponding thread is active.

Figure 4:
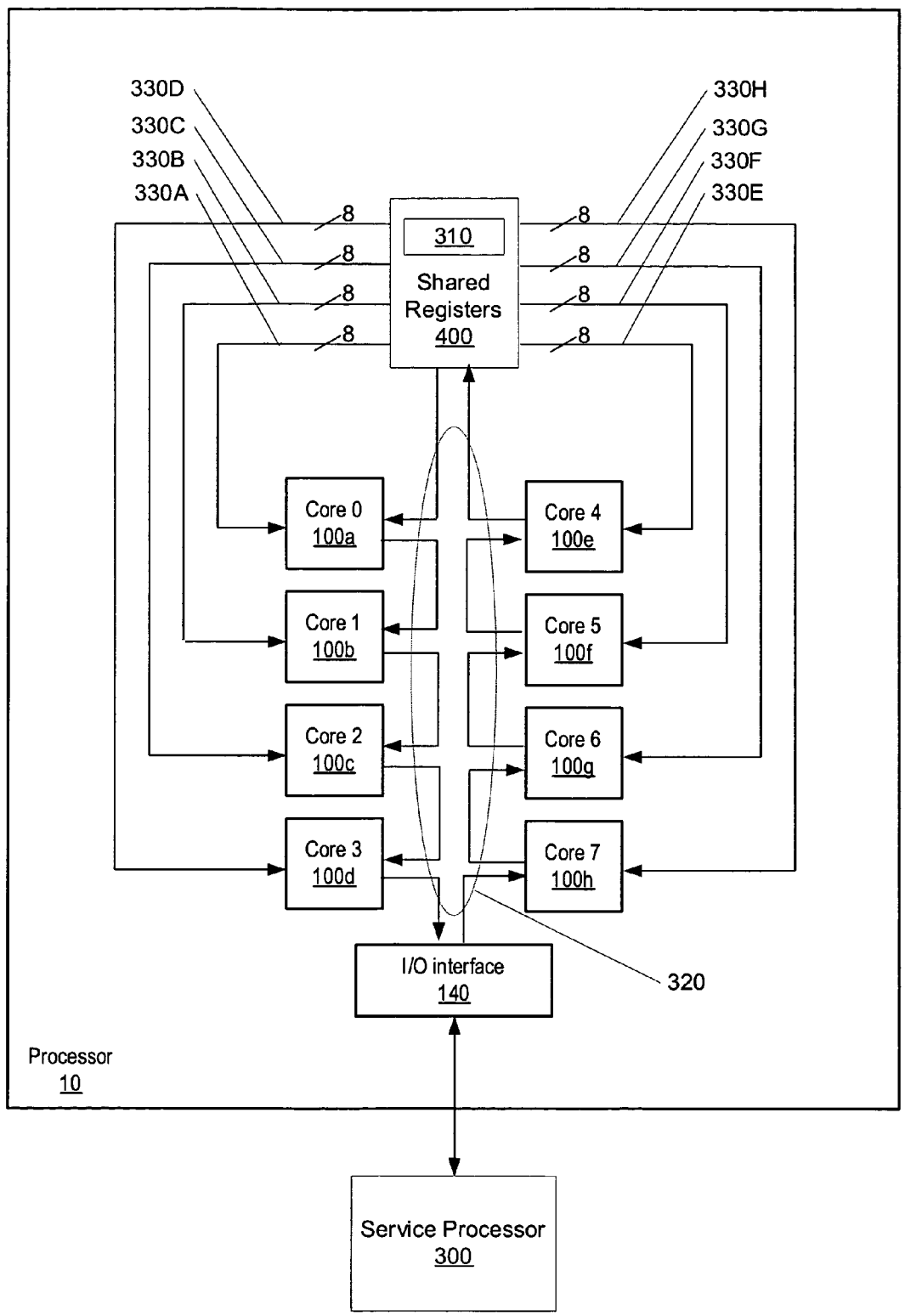
FIG. 4 is a block diagram illustrating one embodiment of a computing system.

FIG. 4 illustrates a view of processor 10 which shows cores 100 coupled to shared register 400, and shared register 310 in particular. As seen in FIG. 4, each of cores 100*a*-100*h* are coupled to a bus 320 which enables access to registers 400. Buses 330 depict couplings from the 64 bits of register 310 to each of cores 100. Also illustrated is a service processor 300 coupled to I/O interface 140. In one embodiment, each of cores 100 and service processor 300 are configured to perform read and/or write accesses to register 310 via bus 320. In addition, in one embodiment, bus 320 is configured as a ring bus wherein transactions traverse the bus in a circular manner. Each device coupled to the bus 320 (e.g., cores 100, registers 400, and I/O interface 140) examines transactions received upon the bus 320 and determines whether the transaction is targeted to that device. If the transaction is not targeted to the receiving device, the transaction is placed back on the bus 320 for forwarding to the next device. As may be appreciated, other bus configurations are possible and are contemplated.

Figure 5:
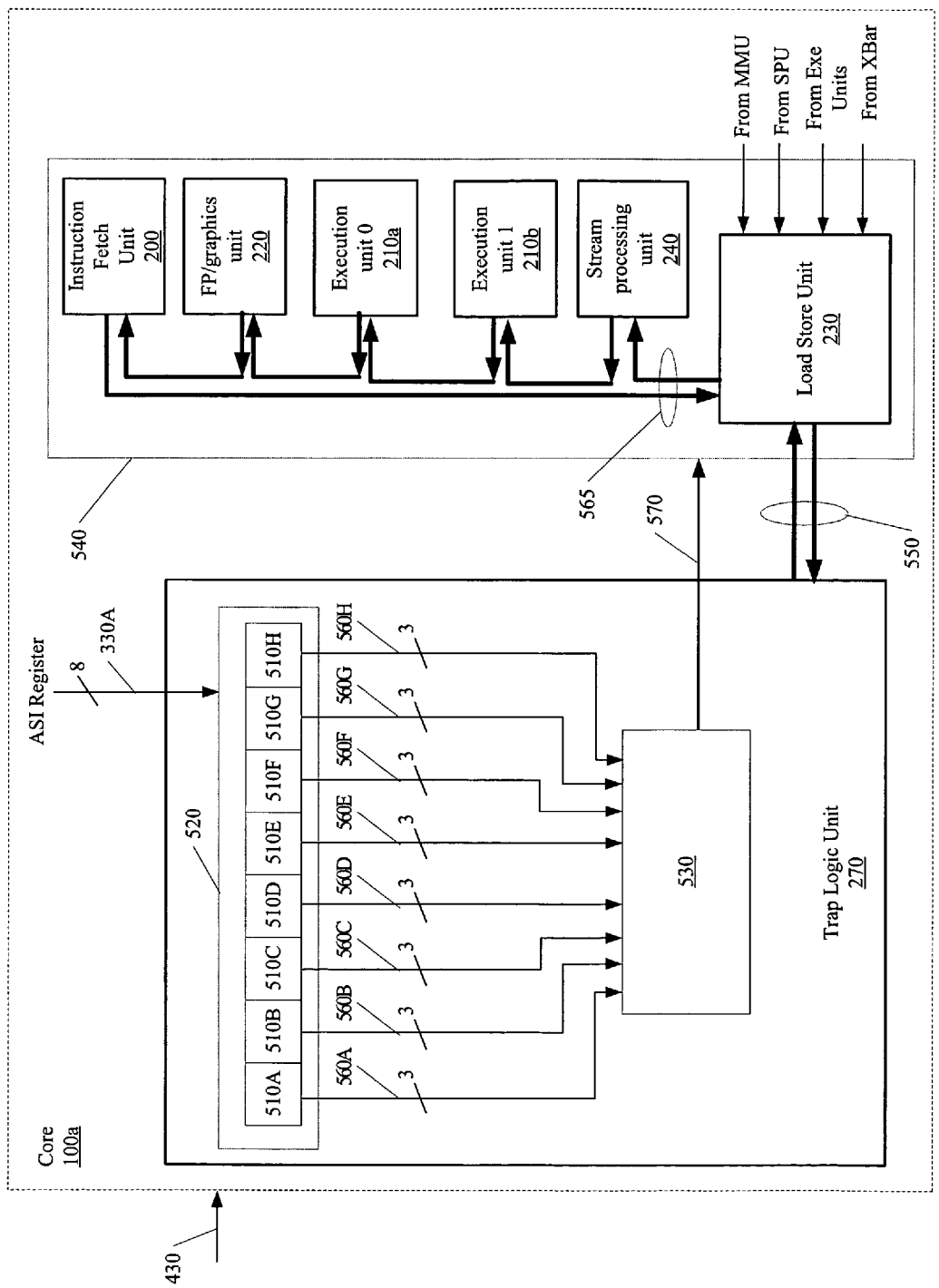
FIG. 5 is a block diagram illustrating one embodiment of a multi-threaded multi-core processor core.

Turning now to FIG. 5, one embodiment of a core 100*a* is shown. Core 100*a* is shown to include a load store unit 230, stream processing unit 240, execution units 210*a*-210*b*, fp/graphics unit 220, and instruction fetch unit 200. Core 100*a* is also shown to include trap logic unit 270. Load store unit 230 is coupled to receive input from memory management unit (MMU) 250, stream processing unit (SPU) 240, execution units (Exe units) 210, and crossbar (XBar) 110. In the embodiment shown, load store unit 230 is coupled via bus 565 to each of the SPU 240, execution units 210, fp/graphics unit 220, and instruction fetch unit 200. In addition, load store unit 230 is coupled to trap logic unit 270 via bus 550.

Each of cores 100 is coupled to receive a global scan flush signal 430. Scan flush signal 430 may generally represent a signal which corresponds to a reset of the latches within cores 100. Trap logic unit 270 is coupled to receive input from the shared register 310 via bus 330A. Trap logic unit 270 further includes logic block 520 which includes sub-blocks 510A-510H. Output from each of sub-blocks 510 is conveyed to circuitry 530. In one embodiment, each of sub-blocks 510A-510H is configured to convey three signals 560A-560H, respectively, as depicted in FIG. 5. A first of the three signals corresponds to a Park signal, a second of the three signals corresponds to an UnPark signal, and a third of the three signals corresponds to a Reset signal. Responsive to the received signals 560, the circuitry 530 is configured to convey signals 570 to one or more of the units indicated by block 540. Included among the signals 570 conveyed may be thread stop signals, thread flush signals, thread reset signals, redirect program counter (PC) signals, as well as others.

In one embodiment, circuitry 530 is configured to convey a first redirect signal to instruction fetch unit 200 in response to detecting assertion of one of the received reset signals 560. The first redirect signal may be generally configured to cause the instruction fetch unit 200 to initiate fetching of instructions corresponding to a reset trap (e.g., a POR trap). In response to detecting the assertion of one of the received park signals 560, the circuitry 530 may be configured to convey a thread stop signal which is configured to stop execution of a corresponding thread. The thread stop signal may further be configured to flush remaining thread instructions from the pipeline. Finally, circuitry 530 may be configured to convey a second redirect signal to the instruction fetch unit in response to detecting assertion of one of the unpark signals 560. The second redirect signal may be configured to cause the instruction fetch unit 200 to resume fetching of instructions at a point where execution was stopped due to previous parking of a thread.

Figure 6:
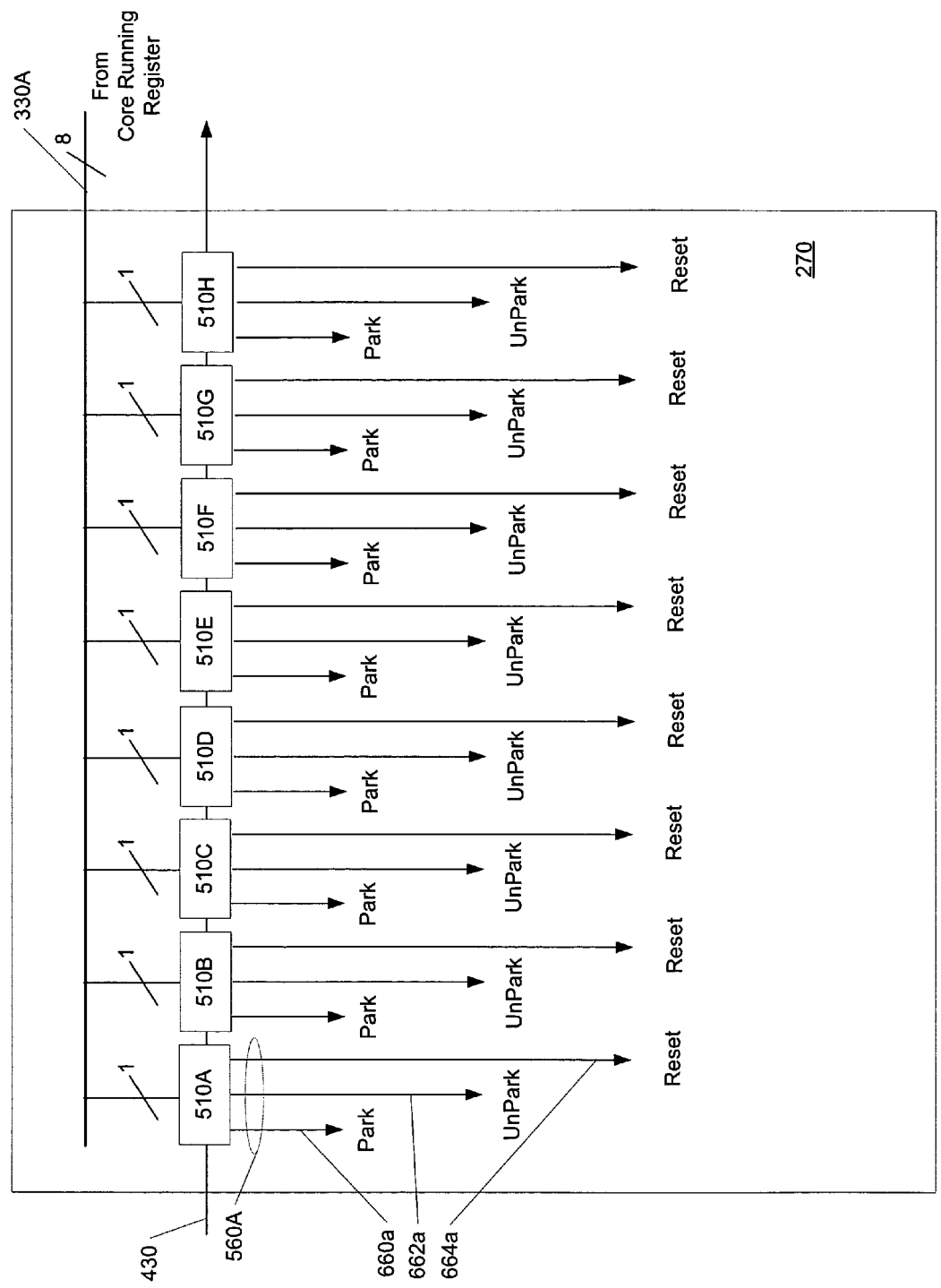
FIG. 6 is a block diagram illustrating one embodiment of a trap logic unit.

FIG. 6 illustrates one embodiment of trap logic unit 270 which shows each sub-block 510 is configured to convey Park, UnPark, and Reset signals. For example, sub-block 510A conveys a Park signal 660a, Unpark signal 662a, and Reset signal 664a. In one embodiment, each sub-block 510 corresponds to a separate thread supported by the core 100a. In the embodiment shown, each of the eight threads supported by the core 100a may be in one of multiple states including "parked" or "unparked." Generally speaking, a parked thread is a thread which is not eligible for selection to execute instructions and an unparked thread is available for selection to execute instructions. As described above, a write to the Thread Running register 310 may cause a corresponding thread to be parked or unparked. In the example of FIG. 6, the Park 660 and UnPark 662 signals illustrated are configured to effect parking and unparking of the corresponding thread, respectively. The Reset signals are configured to perform initialization of a corresponding thread.

Generally speaking, system initialization may include placing the logic associated with each thread into a predetermined state. In one embodiment, as part of a system initialization, the Thread Running register 310 may be initialized by default such that all the threads are parked, except for the lowest numbered enabled thread. Initialization of threads in this manner entails performing a write(s) to the Thread Running register 310. For example, in one embodiment, writing a "1" to a particular bit location of the Thread Running register may cause a corresponding thread to perform a Power On Reset (POR) trap. In the example of FIG. 6, a Reset signal 664 may be conveyed for a given thread in response to writing a "1" to the corresponding bit position of the Thread Running register 310. The assertion of Reset signal 664 causes the TLU to perform a Power On Reset trap for the specified thread. However, as noted above, writing a "1" to a particular bit location of the Thread Running register 310 may also be used to unpark a thread. As may be appreciated, one of three different signals may be conveyed (Park, UnPark, Reset) responsive to a single corresponding bit in the Thread Running register 310. Consequently, a mechanism for distinguishing between a write of "1" to Park a thread and a write of "1" to perform thread reset/initialization is needed.

Figure 7:
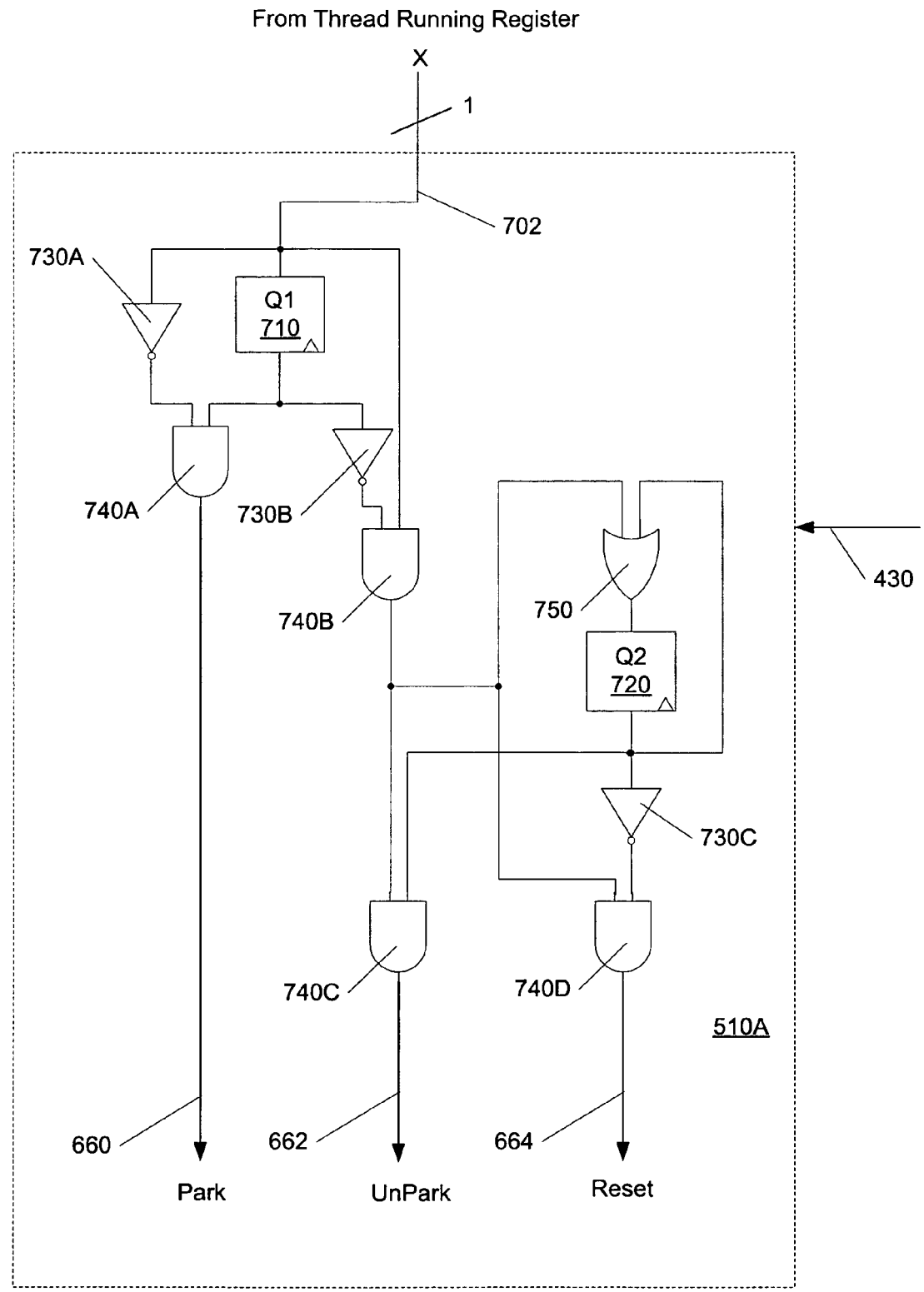
FIG. 7 is a block diagram illustrating one embodiment of a portion of a trap logic unit.

FIG. 7 illustrates one embodiment of a sub-block 510A configured to convey a Park 660, UnPark 662, or Reset 664 signal. Sub-block 510A is coupled to receive a signal X 702 corresponding to a single bit of the Thread Running register 310 and a scan flush signal 430 which may generally correspond to a scan flush of any of the cores 100. Sub-block 510A further includes latches Q1 710 and Q2 720 and a number of logic gates. Signal 702 is coupled as input to latch 710, NOT gate 730A, and AND gate 740B. Logic AND gate 740A is coupled to receive as input the output from latch Q1 710 and NOT gate 730A. NOT gate 730B is coupled to receive as input the output from latch Q1 710 and convey output to AND gate 740b. Output from logic AND gate 740B is coupled as input to logic OR gate 750, AND gate 740D, and AND gate 740C. Output from the latch Q2 720 is coupled as input to OR gate 750, NOT gate 730C, and AND gate 740C. Output from NOT gate 730C is coupled as input to AND gate 740D. Finally, logic AND gate 740A conveys Park signal 660, logic AND gate 740C conveys UnPark signal 662, and logic AND gate 740D conveys Reset signal 664.

In one embodiment, a system scan flush 430 generally causes all latches within core 100a to be set to "0". In one embodiment, scan flush causes the state of latches Q1 710 and Q2 720 to be set to "0". In addition, later steps of system initialization may further cause each thread to be further initialized by way of a POR trap. This further initialization of a thread may be responsive to a corresponding Reset signal 664 conveyed from the sub-block which corresponds to the thread. Consequently, this further initialization may include setting the bits of the Thread Running register 310 to the value "1" in order to cause each thread in the system to take a POR trap. Subsequent to the scan flush of core 100a, the bits of the Thread Running register 310 may be set to the value "0". As described above, a particular embodiment may require that at least one thread be unparked subsequent to a reset. In such a case, the bit for the thread to be unparked will be set to the value "1" as part of (or subsequent to) the system initialization process.

Generally speaking, the outputs from the sub-block 410A may be described by the following logic equations:

$$\text{Park} = (Q1)\, X' \qquad \text{(i)}$$

$$\text{UnPark} = (Q2)\, X(Q1') \qquad \text{(ii)}$$

$$\text{Reset} = (Q2')\, X(Q1') \qquad \text{(iii)}$$

From the above three equations, it can be seen that both the Unpark signal 662 and the Reset signal 664 are asserted when both X 702 is asserted and the state of latch Q1 710 is "0". However, the state of latch Q2 720 determines whether it is the Unpark signal 662 or the Reset signal 664 which is asserted. Only when the state of latch Q2 720 is "0" is the Reset signal 664 asserted.

As noted above, both of latches Q1 710 and Q2 720 may be initialized to "0" upon a scan flush 430. Consequently, the assertion of X 702 subsequent to such a scan flush 430 would cause assertion of the Reset signal 664. However, it is noted that when both of latches Q1 710 and Q2 720 currently have a state of "0" and the signal X 702 has a value of "1", the value conveyed from logic AND gate 740B is "1" and the output from logic OR gate 750 is "1". Therefore, the next value latched into both latch Q1 710 and latch Q2 720 is "1". Accordingly, when latch Q1 710 has a value of "1", the output from AND gate 740B is "0" and the Reset signal 664 transitions to "0". Further, as the output from latch Q2 720 feeds back into itself, the next state for latch Q2 720 will continue to be "1" and the Reset signal 664 will not be asserted for any later 0 to 1 transition of X 702. In contrast, a subsequent assertion of signal X 702 while latch Q1 710 has a state of "0" will cause assertion of the UnPark signal 662 instead. In the absence of an event capable of resetting the state of latch Q2 720 to "0" (e.g., a scan flush 430), the Reset signal 664 will not be asserted again. In this manner, a single bit 702 may be utilized to convey one of three signals (660, 662, 664).

Exemplary System Embodiment

Figure 8:
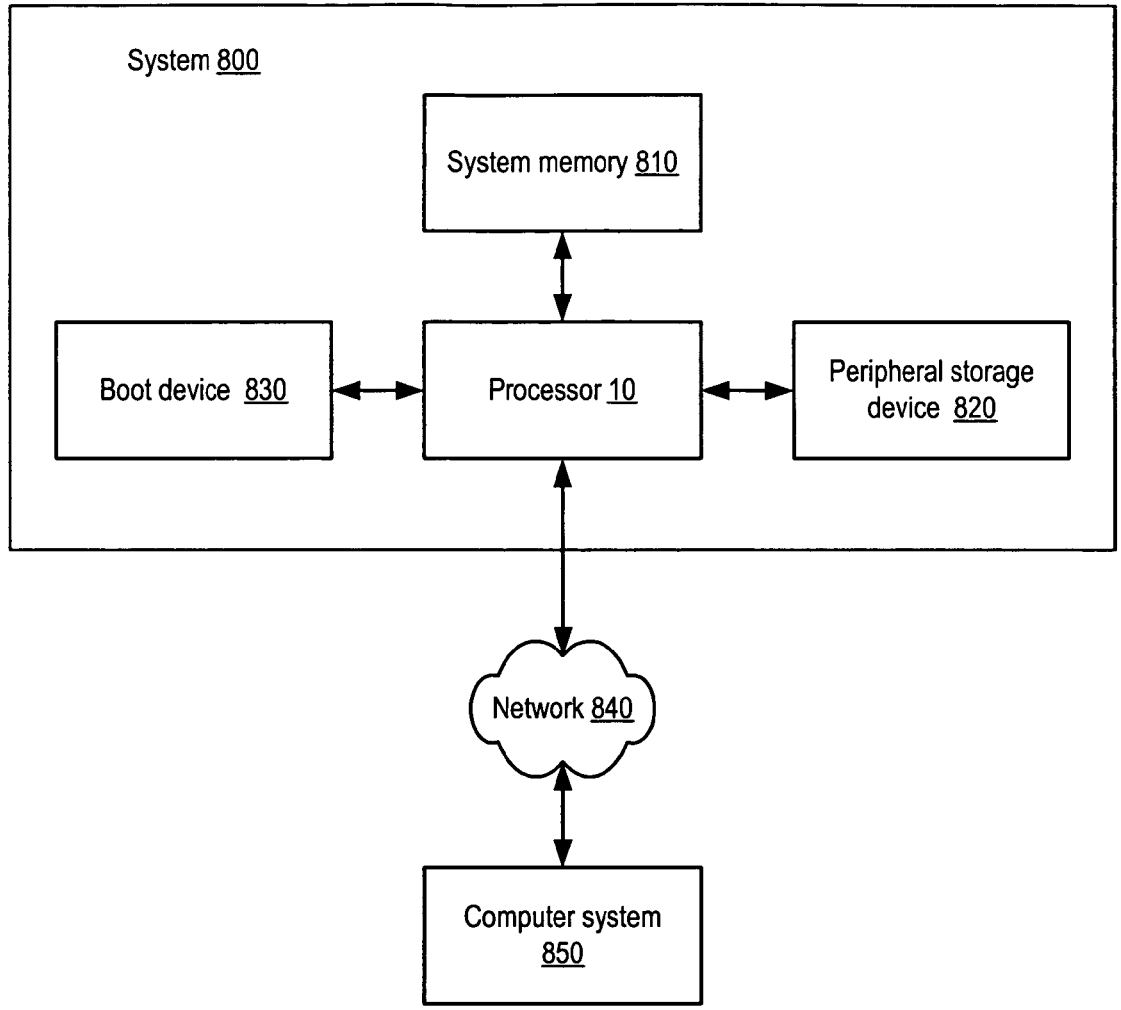
FIG. 8 is a block diagram illustrating one embodiment of a computing system.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

What is claimed is:

1. A multithreaded multicore processor comprising: a plurality of cores, each of said cores being configured to support two or more threads; and a shared thread control register shared by the plurality of cores, the shared thread control register including only a single bit for each of the threads in the plurality of cores; wherein setting a bit of the shared thread control register to a first value causes a corresponding thread in one of said cores to be reset, in response to detecting the processor is in a first state; and wherein setting the bit of the shared thread control register to the first value causes the corresponding thread to be unparked, in response to detecting the processor is in a second state; wherein each of said cores includes a trap logic unit configured to monitor bits of the shared thread control register, and wherein in response to detecting transitions of the monitored bits of the shared register, each trap unit is configured to convey one of a park, unpark, or reset signal for a corresponding thread; and wherein each trap logic unit includes a latch which indicates either said first state or said second state, wherein the latch assumes the first state in response to a reset signal.

2. The multithreaded multicore processor as recited in claim 1, wherein the shared thread control register is coupled to a plurality of buses, and wherein each of said cores is further coupled to a separate bus of the plurality of buses for monitoring bits of the shared thread control register which corresponds to the respective core.

3. The multithreaded multicore processor as recited in claim 2, wherein the reset signal corresponds to a system scan flush signal.

4. The multithreaded multicore processor as recited in claim 3, further comprising circuitry configured to receive the park, unpark, and reset signals, wherein the circuitry is configured to:
convey a first redirect signal to an instruction fetch unit, responsive to assertion of the reset signal, wherein the first redirect signal is configured to cause the instruction fetch unit to initiate fetching of instructions corresponding to a reset trap;
convey a thread stop signal configured to stop execution of a corresponding thread, responsive to assertion of the park signal; and
convey a second redirect signal to the instruction fetch unit, responsive to assertion of the unpark signal, said second redirect signal being configured to cause the instruction fetch unit to initiate fetching of instructions at a point where execution was stopped due to a previous park.

5. The multithreaded multicore processor as recited in claim 3, wherein in response to the assertion of a park signal, a corresponding core is configured to stop fetching instructions for a corresponding thread.

6. The multithreaded multicore processor as recited in claim 5, wherein in response to the assertion of an unpark signal, the execution pipeline is configured to enable instruction fetching for a corresponding thread at the point at which instruction execution was stopped at the time of the parking of the thread.

7. The multithreaded multicore processor as recited in claim 3, wherein in response to the assertion of a reset signal, a corresponding core is configured to perform a reset trap and begin fetching and executing instructions.

8. A trap logic unit comprising:
a plurality of logic blocks, each of said blocks corresponding to a thread of a plurality of threads; and an input configured to receive a plurality of signals from a shared thread register shared by a plurality of cores, the shared thread register including only a single bit for each of the plurality of threads; wherein each of said logic blocks is configured to convey: a reset signal for a corresponding thread, in response to (i) detecting a transition of a bit in the shared thread register from a first state to a second state and (ii) detecting the trap logic unit is in a first state; and an unpark signal for a corresponding thread, in response to (i) detecting a transition of a bit in the shared thread register from a first state to a second state and (ii) detecting the trap logic unit is in a second state; a latch which indicates either said first state or said second state, wherein the latch assumes the first state in response to a reset signal; and wherein each of said logic blocks is further configured to convey a park signal in response to detecting a transition of the bit in the shared thread register from the second state to the first state.

9. The trap logic unit as recited in claim 8, wherein said reset signal is a system scan flush signal.

10. The trap logic unit as recited in claim 9, further comprising circuitry configured to:
  convey a first redirect signal to an instruction fetch unit, responsive to assertion of the reset signal, wherein the first redirect signal is configured to cause the instruction fetch unit to initiate fetching of instructions corresponding to a reset trap;
  convey a thread stop signal configured to stop execution of a corresponding thread, responsive to assertion of the park signal; and
  convey a second redirect signal to the instruction fetch unit, responsive to assertion of the unpark signal, said second redirect signal being configured to cause the instruction fetch unit to initiate fetching of instructions at a point where execution was stopped due to a previous park.

11. The trap logic unit as recited in claim 9, wherein in response to the assertion of a park signal, a corresponding core is configured to stop fetching instructions for a corresponding thread.

12. The trap logic unit as recited in claim 11, wherein in response to the assertion of an unpark signal, the execution pipeline is configured to enable instruction fetching for a corresponding thread at the point at which instruction execution was stopped at the time of the parking of the corresponding thread.

13. The trap logic unit as recited in claim 9, wherein in response to the assertion of a reset signal, a corresponding core is configured to perform a reset trap and begin fetching and executing instructions.

14. A computing system comprising:
  a multithreaded multicore processor; a peripheral storage device; and a system memory; wherein the processor comprises: a plurality of cores, each of said cores being configured to support one or more threads; and a shared thread register shared by the plurality of cores, the shared thread register including only a single bit for each of the threads in the plurality of cores; wherein setting a bit of the shared thread register to a first value causes a corresponding thread in one of said cores to be reset, in response to detecting the processor is in a first state; wherein setting the bit of the share thread register to the first value causes the corresponding thread to be unparked, in response to detecting the processor is in a second state; wherein each of said cores includes a trap logic unit configured to monitor bits of the shared thread register, and wherein in response to detecting transitions of the monitored bits of the shared register, each trap unit is configured to generate one of a park, unpark, or reset signal for a corresponding thread; wherein each trap logic unit includes a latch which indicates either said first state or said second state, wherein the latch assumes the first state in response to a reset signal.

15. The computing system as recited in claim 14, wherein the shared thread register is coupled to a plurality of buses, and wherein each of said cores is further coupled to a separate bus of the plurality of buses for monitoring bits of the shared thread register which correspond to the respective core.

16. The computing system as recited in claim 15, wherein said reset signal corresponds to a system reset signal.

17. The computing system as recited in claim 16, wherein in response to the assertion of a park signal, a corresponding core is configured to stop fetching instructions for a corresponding thread.

18. The computing system as recited in claim 17, wherein in response to the assertion of an unpark signal, the execution pipeline is configured to enable instruction fetching for a corresponding thread at the point at which instruction execution was stopped at the time of the parking of the thread.

19. The computing system as recited in claim 16, wherein in response to the assertion of a reset signal, a corresponding core is configured to perform a reset trap and begin fetching and executing instructions.

20. The computing system as recited in claim 15, wherein the trap logic unit is configured to: convey a first redirect signal to an instruction fetch unit, responsive to assertion of a generated reset signal, wherein the first redirect signal is configured to cause the instruction fetch unit to initiate fetching of instructions corresponding to a reset trap sequence; convey a thread stop signal configured to stop execution of a corresponding thread, responsive to assertion of a generated park signal; and convey a second redirect signal to the instruction fetch unit, responsive to assertion of a generated unpark signal, said second redirect signal being configured to cause the instruction fetch unit to initiate fetching of instructions at a point where execution was stopped due to a previous park.

* * * * *